UNITED STATES PATENT OFFICE 2,374,237

PRODUCTION OF VINYL HALIDES

Herbert Muggleton Stanley, Tadworth, and James Ernest Youell, Wallington, England, assignors to The Distillers Company Limited, Edinburgh, Scotland, a British company No Drawing. Application September 23, 1942, Serial No. 459,440. In Great Britain July 1, 1941

8 Claims. (Cl. 260—656)

The vapour phase decomposition of ethylene dichloride takes place non-catalytically at 500–550° C. in accordance with the equation:

$$C_2H_4Cl_2 \rightarrow C_2H_3Cl + HCl - 10 \text{ kg. cal.}$$

The technical difficulties encountered in carrying out this reaction are: (I) at the high temperatures necessary for the reaction practically all the common materials of construction, including steel and stainless steels, are badly corroded by the hydrogen chloride; (II) the reaction is highly endothermic and consequently can only be carried out in multistage units with interstage preheaters or in heated vessels having a large ratio of surface to volume, i. e., in heated tubes of relatively small bore; and (III) considerable quantities of carbon are formed as by-product with consequent reduction in the efficiency of the process.

The troubles enumerated under (I) and (III) can be largely minimised by the use of certain gaseous catalysts which accelerate the decomposition of ethylene dichloride to such an extent that it can be carried out at relatively low temperatures, e. g., about 350° C. at which temperature many suitable materials of construction, notably certain nickel-chromium alloys, appear to be quite resistant to the corrosive action of hydrogen chloride. The catalysts which have been found highly effective are chlorine, bromine and oxygen as well as certain readily decomposable substances such as chlorine dioxide. It is possible that these substances function as catalysts by virtue of their ease of decomposition into free radicals and/or halogen atoms which are able to initiate a chain reaction with the ethylene dichloride. Whatever be the mechanism of the process, however, the use of such substances in the decomposition of ethylene dichloride does not overcome the difficulty enumerated in (II), namely, that arising from the high endothermicity of the decomposition process.

The present invention overcomes all the difficulties by combining the endothermic reaction:

(I)   $C_2H_4Cl_2 \rightarrow C_2H_3Cl + HCl - 10$ kg. cal.

with the exothermic chlor-substitution reaction:

(II)   $C_2H_4 + Cl_2 \rightarrow C_2H_3Cl + HCl + 24$ kg. cal.

in such proportions that the overall thermal effect is very small. In the presence of excess ethylene dichloride at about 300–350° C. the chlorination of ethylene takes place and at the same time the decomposition of ethylene dichloride is catalysed, probably by chlorine atoms or other active radicals. As a result, it is possible to carry out the combined reaction at temperatures of the order of 330°–340° C. with substantially complete utilisation of the chlorine and simultaneous decomposition of ethylene dichloride to the extent of 40–50%. In order to avoid localised zones of high temperature the preferred method of carrying out this process is to introduce chlorine in a number of separate streams at different points along the reaction zone into a preheated mixture of ethylene dichloride vapour and ethylene. If all the chlorine is introduced at one point into the reaction zone, it appears that the exothermic chlorination of ethylene takes place at such a high rate that the somewhat slower endothermic decomposition of ethylene dichloride does not sufficiently absorb the heat generated by the former reaction, and, as a result, undue temperature rise and carbon formation takes place. In practice, we prefer to vapourise ethylene dichloride, admix therewith the requisite quantity of ethylene and feed the resulting preheated gas mixture into a tubular reaction zone heated externally to about 360° C.

The ethylene dichloride used in the process should preferably be free from alcoholic or hydrocarbon impurities such as, ethyl alcohol, benzene, or ethylene chlorhydrin and may be aerated prior to vapourisation in order to introduce traces of oxygen which, we have found, facilitate the process. Alternatively small amounts (up to about 0.1% molar) of pure oxygen may be fed in gaseous form into the preheated gaseous mixture of ethylene and ethylene dichloride. The proportion of ethylene to ethylene dichloride in the feed vapours can be varied within wide limits, but the ethylene should always be in excess of the chlorine subsequently added; in order to obtain maximum yields of vinyl chloride we prefer to use 1 to 2 mols. of ethylene and 5 to 10 mols. of ethylene dichloride per mol. of chlorine. As the combined reaction can be rendered thermally self-supporting or even slightly exothermic, provision for heating the reaction chamber may be unnecessary.

A further improvement in the present invention is to carry out the combined reaction as already described, in the presence of small quantities of certain gaseous catalysts, which still further reduce the temperature of reaction and so reduce the possibilities of corrosion of the materials of construction of the reaction chamber. Such gaseous catalysts include traces of oxygen and readily decomposable chlorine or bromine compounds which probably function by their ease of dissociation into free radicals.

This process can be conveniently combined with the production of ethylene dichloride. Since, in the combined process described above, an excess of ethylene over chlorine is best employed, the gaseous reaction products from the combined decomposition and chlorination process consist after removal of hydrogen chloride, of ethylene dichloride, trichloroethane, vinyl chloride, traces of high boiling substances and unchanged ethylene. This gas mixture is subjected to a fractionation washing operation in which it is washed in counter-current with a stream of a suitable liquid solvent (e. g., ethylene dichloride) in a suitable tower, the base of which is heated. With suitable arrangement of temperature and tower height, it is possible to obtain practically all the vinyl chloride in the form of a solution which is thereafter subjected to pressure fractionation to yield pure vinyl chloride. The unabsorbed gases from the washing operation consist mainly of ethylene with only small amounts of vinyl chloride. These gases are either recycled through the reaction zone with addition of fresh ethylene dichloride and chlorine or, alternatively, they are led to a chlorination unit wherein the ethylene is converted into ethylene dichloride.

The following examples illustrate the manner in which the invention may be carried into effect, references to volumes of gases being calculated on the basis of normal temperature and pressure.

*Example 1.*—The reaction is carried out in a tube of heat-resistant glass of 11 mm. internal diameter heated in a tubular electric furnace over 5 feet of its length, the annulus temperature being about 360° C. A preheated mixture of ethylene (10 litres per hour) and ethylene dichloride vapour (220 gms. per hour) was passed through this tube and chlorine (9 litres per hour) was introduced in three approximately equal proportions at points about 1 foot 6 inches, 2 feet 9 inches and 4 feet, respectively, measured from the inlet of the tube. Approximately 49% of the ethylene dichloride and 29% of the ethylene fed in underwent reaction. The yield of vinyl chloride on the ethylene dichloride and ethylene consumed was 83%, while the yield of vinyl chloride and trichlorethane on the same basis was 94%. In this experiment the initial mixture contains chlorine, ethylene, and ethylene dichloride in molar ratios of 1:1.1:1.5.

*Example 2.*—The same apparatus and conditions were used as in Example 1, except that the feed rates were as follows: chlorine, 2.79 litres per hour, ethylene, 4.2 litres per hour, and ethylene chloride 127 grm. per hour (molar ratio of chlorine:ethylene:ethylene dichloride of 1.1.5:10.3). The yield of vinyl chloride and of vinyl chloride+trichlorethane, based on the ethylene dichloride and ethylene consumed, were 87% and 92% respectively. Approximately 50% of the ethylene dichloride fed into the apparatus and 47% of the ethylene underwent reaction.

The ethylene dichloride used in both of these examples contained small amounts of dissolved oxygen as a result of exposure to air.

It will be appreciated that the process is applicable to the production of vinyl halides generally.

What we claim is:

1. A process for the manufacture of vinyl chloride by the simultaneous thermal decomposition of ethylene dichloride and chlor-substitution of ethylene which comprises subjecting a gaseous mixture containing ethylene dichloride, ethylene and chlorine to a homogeneous vapour phase reaction at a temperature between 300° and 400° C., the ethylene being in molar excess in relation to the chlorine.

2. A process according to claim 1 wherein oxygen is added to the said gaseous mixture as a gaseous catalyst by aeration of the liquid ethylene dichloride prior to the vaporisation thereof.

3. A process according to claim 1 wherein a major proportion of the ethylene dichloride is present in the gaseous mixture.

4. A process according to claim 1 wherein the chlorine is introduced in a number of separate streams at different points along a reaction zone into a pre-heated mixture of ethylene dichloride vapour and ethylene.

5. A process according to claim 1 wherein the molar proportion of ethylene to chlorine is from 1 to 2:1 and the molar proportion of ethylene dichloride to chlorine is from 5 to 10:1.

6. A process according to claim 1 wherein the reaction vessel is heated by external means to a temperature of 360° C.

7. A process according to claim 1 wherein a substance decomposable to yield chlorine is added as a gaseous catalyst.

8. A process according to claim 1 wherein the vinyl chloride is stripped from the reaction mixture, the residual mixture of ethylene dichloride and ethylene being re-cycled in the process.

HERBERT MUGGLETON STANLEY.
JAMES ERNEST YOUELL.